United States Patent Office 3,503,623
Patented Mar. 31, 1970

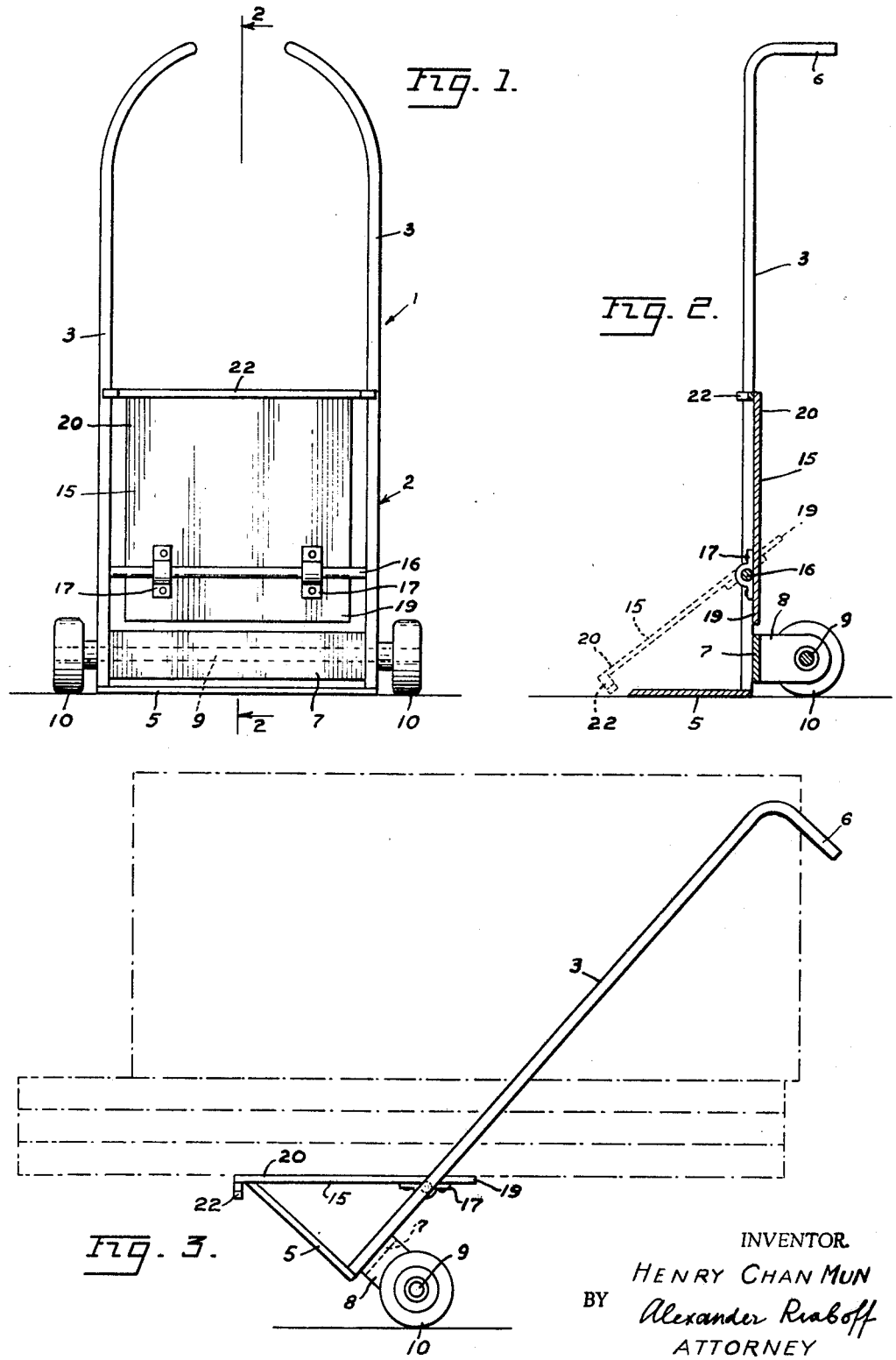

3,503,623
HAND TRUCK
Henry C. Mun, 162 7th St., Oakland, Calif. 94606
Filed May 31, 1968, Ser. No. 733,700
Int. Cl. B62b 1/04
U.S. Cl. 280—47.28     2 Claims

ABSTRACT OF THE DISCLOSURE

A hand truck having, in addition to a usual plate for carrying loads, an auxiliary swingable platform for carrying long articles arranged thereon longitudinally in respect to the direction of the truck's travel.

OBJECTS OF THE INVENTION

This invention relates to a hand truck.

A hand truck carries loads on a comparatively narrow plate secured to the lower end of the truck frame, which loads are generally arranged transversely to the direction of the truck's travel.

Long articles, when placed on the plate in the usual manner, extend beyond the frame on both sides, and therefore present an awkward load which are difficult to manage and impossible to move through door openings, narrow passages and halls.

The object of this invention is to provide an auxiliary platform for carrying long articles placed thereon between the hand shafts of the truck frame, whereby the articles become arranged longitudinally in respect to the direction of the truck's travel, thus permitting the truck to pass through doors and narrow passages without difficulty.

DESCRIPTION OF THE DRAWING

This invention is illustrated in a drawing in which:
FIG. 1 is a front elevational view of the truck.
FIG. 2 is a sectional view taken along the line 2—2 of FIG. 1, and
FIG. 3 is a side elevation of the truck illustrating its operation.

DESCRIPTION OF THE DEVICE

A usual hand truck 1 consists of a frame 2, including two parallel spaced hand shafts 3, connected at their lower ends by a load lifting and carrying rectangular plate 5, secured at a right angle thereto and extending forwardly therefrom. The shafts 3 terminate with handles 6.

A cross piece is welded or otherwise secured to the shafts 3 slightly above said plate 5, which piece is formed at its ends with ears 8 extending rearwardly and supporting an axle 9 passing therethrough.

The truck 1 rides on wheels 10 mounted on the ends of the axle 9.

The truck carries loads on the plate 5 arranged transversely to the direction of its travel.

In order to enable the truck to carry long articles through narrow passages, an auxiliary platform 15 is swingably secured between the shafts 3 by means of an axle 16 attached thereto above said plate 5 a distance substantially equal to the width of the same. The platform carries a pair of spaced brackets 17 secured thereto near one end thereof through which the axle 16 passes.

The platform 15, when not in use, remains between the shafts 3. Its lower end 19 is slightly above the cross piece 7, and its upper end 20 extends above the axle 16 a distance not less than a distance from said axle 16 to the front edge of the plate 5. The width of the platform is somewhat smaller than the distance between the hand shafts 3.

The platform 15 is provided with a stop cross piece 22 secured to the upper edge thereof extending to said hand shafts and engaging the same to hold said platform between said shafts.

The platform 15 is brought in an operational position by swinging the same in a counter clockwise direction, looking at FIG. 2, to permit the cross piece 22 to rest on the ground. One end of an article, such as a piece of lumber, is placed on the end 19 of the platform between the hand shafts 3, while the other end of said article rests on the ground. The weight of the article swings the platform in a clockwise direction to line up with said article. Other articles are placed on the platform in such a way that the center of gravity of the load is over the platform 15.

When the truck is loaded, the handle shafts 3, which remain vertical, are now pulled backwardly and downwardly to about a 45° angle to the ground, at which position the platform 15 assumes substantially horizontal position, and the truck is ready to be moved forwardly or backwardly.

I claim:
1. In a hand truck including:
a frame having a pair of hand shafts,
a load lifting plate and a pair of wheels secured to the lower ends of said shafts,
means for carrying long objects between the hand shafts arranged longitudinally to the direction of the truck's travel, said means comprising:
    an auxiliary platform normally carried by said truck between said hand shafts,
    an axle attached to said hand shafts above said load lifting plate and near the same,
    brackets secured to said platform near its lower end for swingably attaching the platform to said axle, the upper portion of the platform above said brackets being somewhat longer than the distance from said axle to the front edge of said load lifting plate, thus permitting said upper end of the platform to rest on said front edge when the platform is swung downwardly into an operating position, and
said hand shafts being disconnected for the distance from said axle to the upper ends of the same.
2. In a hand truck including:
a frame having a pair of hand shafts,
a load lifting plate secured to lower ends of said shafts,
a cross piece connecting said shafts at their lower ends,
a pair of wheels secured to said frame near the lifting plate,
means for carrying long objects arranged between the hand shafts longitudinally to the direction of the trucks travel, said means comprising:
    an auxiliary platform normally carried by the truck between said hand shafts and immediately above said cross piece,
    an axle secured to said hand shafts above said lifting plate and parallel thereto at a distance substantially equal to the width of said plate,
    brackets attached to said platform near its lower end for swingably connecting said platform to said axle,
    said platform being of such length as to rest its upper end on the front edge of said lifting plate when said upper end is swung downwardly for placing the platform in operative position,
    means for holding said platform between said hand shafts when said platform is in inoperative position, and said hand shafts being disconnected for the distance from said axle to the upper ends of the same.

References Cited

UNITED STATES PATENTS

| 1,945,969 | 2/1934 | Earle et al. | 280—47.28 |
| 1,948,206 | 2/1934 | Earle et al. | 280—47.28 |
| 2,113,174 | 4/1938 | Earle | 280—47.28 |
| 2,199,306 | 4/1940 | Earle | 280—47.28 |

ALBERT J. MAKAY, Primary Examiner

U.S. Cl. X.R.

214—370